Aug. 11, 1970         D. KLEIST         3,523,774
ROTARY APPARATUS FOR FORMING GLASS FIBERS
Original Filed June 2, 1966                 3 Sheets-Sheet 1

INVENTOR.
DALE KLEIST
BY
Staelin & Overman
ATTORNEYS

INVENTOR.
DALE KLEIST of a rotating hollow spinner of large diameter having ten thousand or more orifices through which streams of glass are centrifuged through a high temperature environment at the periphery of the spinner and engaging the glass streams with a low temperature high velocity blast directed by a surface toward the spinner for attenuating the streams to fibers and progressively constricting the expansion of the gases between the spinner and the surface in the direction of movement of the gases.

United States Patent Office 3,523,774
Patented Aug. 11, 1970

3,523,774
ROTARY APPARATUS FOR FORMING
GLASS FIBERS
Dale Kleist, St. Louisville, Ohio, assignor to Owens-Corning Fiberglas Corporation, a corporation of Delaware
Continuation of application Ser. No. 554,756, June 2, 1966. This application July 11, 1969, Ser. No. 845,674
Int. Cl. C03c 19/04, 37/04
U.S. Cl. 65—14                                              5 Claims

ABSTRACT OF THE DISCLOSURE

The disclosure embraces a method of and apparatus for processing glass to form glass fibers involving the use of a rotating hollow spinner of large diameter having ten thousand or more orifices through which streams of glass are centrifuged through a high temperature environment at the periphery of the spinner and engaging the glass streams with a low temperature high velocity blast directed by a surface toward the spinner for attenuating the streams to fibers and progressively constricting the expansion of the gases between the spinner and the surface in the direction of movement of the gases.

This application is a continuation of application Ser. No. 554,756, filed June 2, 1966, now abandoned This invention relates to method of and apparatus for processing heat-softenable mineral materials, such as glass, and more especially to a method and arrangement for projecting a comparatively large number of bodies or primary filaments of glass from an orificed peripheral wall of a rotating hollow spinner or rotor under the influence of centrifugal forces and the delivered or projected bodies engaged by an attenuating blast for forming the bodies or primary filaments into fine fibers.

Glass fibers have been heretofore produced by delivering primary filaments or bodies of glass from a rotating orificed rotor or spinner and the bodies attenuated to fibers by an attenuated blast. In methods and apparatus heretofore used, a hollow rotor or spinner of a diameter of approximately eight inches has been employed in centrifuging the glass from orifices in the peripheral wall of the spinner, the centrifuged bodies or primaries of glass being attenuated by a gaseous blast, such as a steam blast, delivered from a blower of conventional construction. Steam pressures of one hundred pounds or more per square inch are required to successfully attenuate the projected bodies or primaries to discrete fibers.

The throughput of glass through a hollow spinner of about eight inches in diameter is limited by several factors. The number of orifices or passages in the spinner wall is necessarily limited. Efforts have been made to utilize a rotor of this diameter of increased depth but various factors impair the successful distribution of the molten glass on the orificed wall of the rotor as it is essential to maintain glass in a mobile condition throughout the interior surface area of the orificed wall to obtain primaries or bodies of glass of substantially the same viscosity from all of the orifices. In the use of a spinner or rotor of greater depth, the lower region of the spinner tends to become cool, the reduced temperature increasing the glass viscosity at such region. The nonuniform heat pattern impairs the throughput of glass at the lower region of the rotor. Endeavors to secure a higher throughput of glass from an eight inch diameter spinner by increasing the spinner speed result in attenuated fibers of inferior quality.

In order to increase the fiber yield, a spinner of larger diameter was employed in conjunction with a standard steam blower construction and it was found that the character of the attenuating blast from the blower impaired the maintenance of a high temperature environment at the spinner wall to an extent resulting in a nonuniform heat pattern for the primary filaments or bodies of glass projected from the rotor and hence the primary filaments were of varying viscosities. The arrangement promoted excessive turbulence resulting in attenuated fibers of inferior quality.

The present invention embraces the provision of a method of processing glass in the formation of fine glass fibers involving the utilization of a hollow spinner or rotor of comparatively large diameter with an attenuating blast controlled to maintain a high temperature environment for the peripheral region of the spinner or rotor whereby the attenuated fibers are of improved quality.

The present invention embraces the provision of a method of processing glass in the formation of fine glass fibers involving the utilization of a hollow spinner or rotor of substantially increased diameter providing a greatly increased number of orifices with a corresponding substantial increase in the throughput of glass with a proportionate reduction in the expenditure of heat energy compared to the increased fiber yield.

An object of the invention resides in a method of forming primary filaments or bodies of glass by centrifuging the glass from a comparatively large diameter spinner through not less than ten thousand orifices in the spinner wall and maintaining a high temperature environment at the peripheral region of the spinner to improve the heat pattern throughout the entire peripheral wall area whereby to promote the delivery of primary filaments of substantially the same viscosity from all of the orifices in the spinner wall.

Another object of the invention resides in the use of a gaseous blast with the large diameter spinner under conditions wherein the gas pressures for producing the high velocity attenuating blast are substantially reduced whereby a substantial saving in heat energy is attained while maintaining efficient attenuation in the production of fine fibers.

Another object resides in the provision of fiber-forming means utlizing a rotating hollow spinner for centrifuging primary filaments of glass and a blower construction providing an attenuating blast wherein heat applied in the region of the peripheral wall of the spinner maintains a high temperature environment throughout the area of the spinner wall through control of direction of movement of the gases of the blast in a manner to reduce turbulence and sustain high velocities of the gases at the attenuating region.

Another object of the invention resides in modifying the shape or profile of a blast-controlling surface area of a blower to effect increased confinement of gases and sustained gas velocities adjacent the peripheral wall of a rotating spinner at the attenuating region.

Another object resides in a method of and apparatus for utilizing centrifugal forces for forming and delivering primaries of glass into a gaseous attenuating blast of a character whereby the attenuated fibers collected and processed into mat formation provides a mat of reduced density having improved heat insulating characteristics.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figure 1:
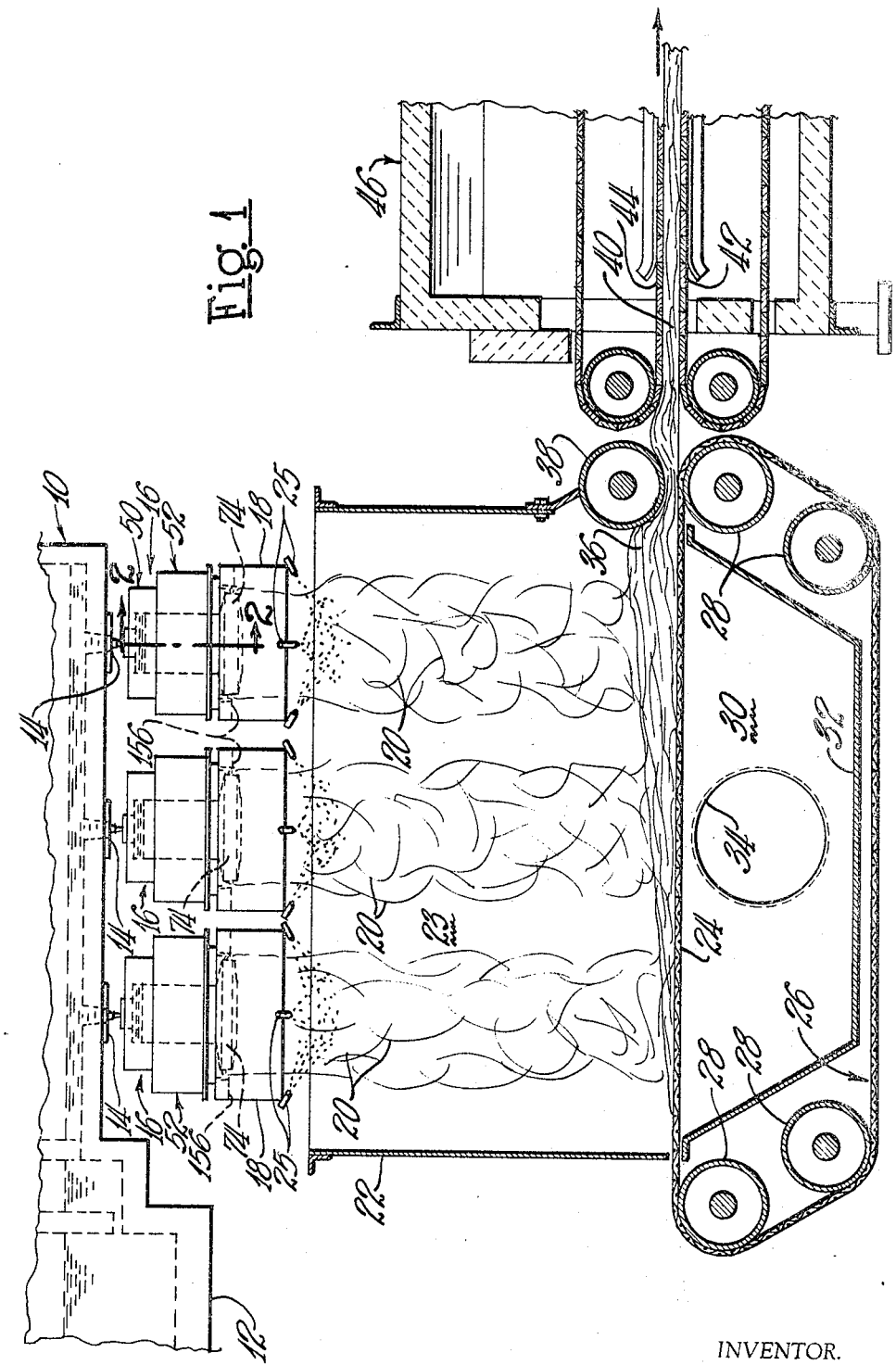
FIG. 1 illustrates a group or series of fiber-forming units embodying the invention wherein the fibers from the several units are collected to form a fibrous mat.

Referring to the drawings in detail and initially to FIG. 1, there is illustrated a series or group of fiber-forming units embodying the invention disposed so as to deliver attenuated fibers onto a moving conveyor, the accumulated mass of fibers being processed to form a fibrous mat. The arrangement includes a forehearth 10 connected with a suitable melting and refining furnace 12 in which glass batch or other mineral fiber-forming material is reduced to flowable or molten condition by the application of heat.

The molten or heat-softened glass flows from the furnace 12 through the conventional channel in the forehearth 10 providing a supply of heat-softened glass for the several fiber-forming units. In the embodiment illustrated, three fiber-forming units are disposed beneath the forehearth in aligned relation, it being understood that a lesser or greater number of units may be employed depending upon the characteristics desired for the mat produced from the collected fibers.

Disposed beneath and secured to the forehearth are spaced stream feeders or bushings 14, there being one feeder for each fiber-forming unit, each of the feeders being arranged to deliver one or more streams of glass to the adjacent unit. Each fiber-forming unit 16 is disposed beneath one of the feeders 14, each unit embodying the invention for forming the glass of the stream into discrete bodies or primary filaments by centrifuging the glass from a hollow spinner of large diameter, the primary filaments being attenuated to fine fibers by an annularly-shaped gaseous blast.

The fiber-forming units are supported by conventional frame means (not shown). The attenuating region of each fiber-forming unit is surrounded by a cylindrically-shaped guard member 18. The fibers are delivered into a walled chamber or forming hood 22. A plurality of nozzles 25 are supported in spaced relation adjacent the guard 18 for delivering binder or adhesive onto the fibers in the chamber 23 provided by the forming hood.

Disposed at the base of the forming hood 22 is the upper flight 24 of an endless belt conveyor 26, the fibers moving downwardly under the influence of the gases of the attenuating blasts and by gravity onto the conveyor flight 24.

The conveyor 26 is supported by a plurality of rolls 28, one of the rolls being driven by conventional motive means (not shown) to advance the upper flight 24 in a right-hand direction. Arranged beneath the upper flight 24 of the conveyor in registration with the chamber 23 is a suction chamber 30 defined by a receptacle 32, the chamber 30 being connected by a pipe 34 with a suction blower of conventional character (not shown) for establishing subatmospheric pressure in the chamber 30.

The subatmospheric or reduced pressure in the chamber 30 assists in the collection of the fibers 20 upon the conveyor flight 24 and conveys away the spent gases of the attenuating blasts. The fibers accumulate in a mass 36 which is moved by the conveyor beneath a sizing roll 38 to compress the mass of fibers to mat formation. The mat 40 of compressed fibers is conveyed by endless belts 42 and 44 through an oven or curing chamber 46 in which the binder or adhesive on the fibers is cured or set by the application of heat and circulating air in the oven in a well known manner.

Figure 2:
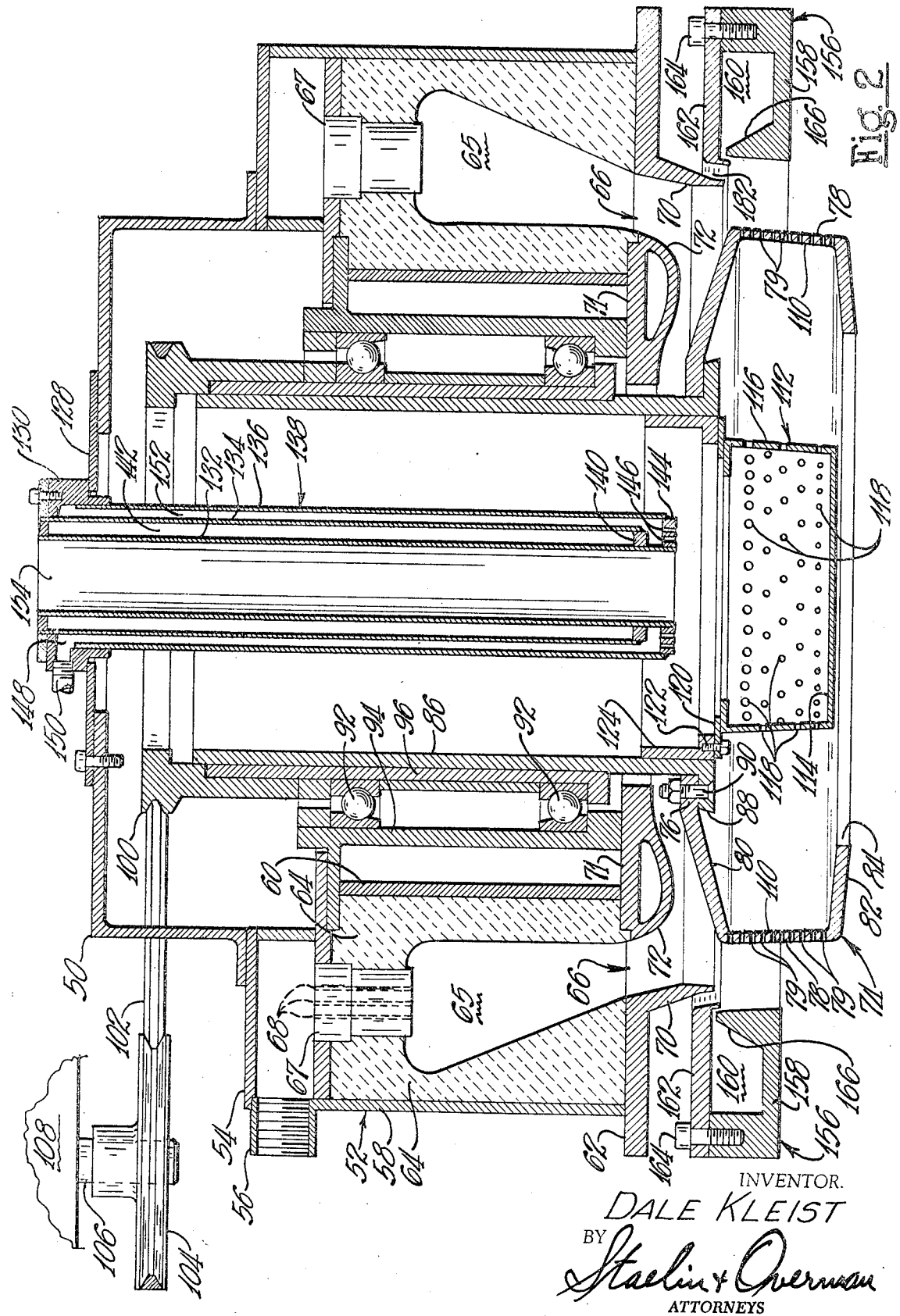
FIG. 2 is a vertical sectional view of one of the fiber-forming units, the view being taken substantially on the line 2—2 of FIG. 1.

FIG. 2 illustrates one arrangement of hollow spinner or rotor of comparatively large diameter, a burner providing a heated environment for the rotor and means for delivering an attenuating blast into engagement with the primary filaments or bodies of glass projected from orifices in the peripheral wall of the spinner. The construction is inclusive of a support means or frame 50 mounting an annular combustion burner construction 52. The burner construction is inclusive of an annularly-shaped manifold 54 provided with a fitting 56 for connection with a supply of fuel and air mixture for the burner.

The burner is inclusive of substantially concentric outer and inner walls 58 and 60 and a base plate or member 62. The interior regions of the walls 58 and 60 are lined with refractory 64 shaped to provide a confined combustion zone or chamber 65 of annular shape having an annular restricted throat or discharge passage 66 through which the hot gases of combustion are delivered to provide a heated environment for the peripheral region of the spinner.

The rear or upper wall of the combustion chamber 65 is provided with circumferentially spaced openings accommodating fittings 67, each fitting being fashioned with a plurality of comparatively small diameter passages 68 through which combustible mixture from the manifold 54 is delivered under comparatively low pressure into the combustion chamber 65.

The plate 62 is provided with a circular depending skirt or portion 70 and a second plate or member 71 of annular shape has a surface 72 cooperating with the portion 70 to direct the gases of combustion toward the peripheral region of the spinner.

The hollow rotor or spinner 74 is fashioned with a hub portion 76, a peripheral wall or wall portion 78, a web or flange portion 80 joining the hub portion with the upper region of the peripheral wall 78, and an inwardly extending flange 82 integrally joined with the lower region of the peripheral wall 78. The inner circular edge of the flange 82 defines an opening or open area 84 of the spinner.

The hollow spinner is secured to a hollow or tubular shaft 86, the shaft 86 having a flange portion 88 engaged by the hub 76 of the spinner. Bolts 90 secure the hub of the spinner to the flange 88. The spinner 74 and shaft 86 are rotatably supported in antifriction bearings 92 disposed between a circular wall 94 supported by the burner construction 52 and a sleeve 96 secured to the tubular shaft 86. Mounted on the sleeve 96 is a sheave 100 accommodating a driving belt or driving means 102, the driving belt engaging a pulley 104 mounted upon a shaft 106 of an electrically energizable motor 108 for rotating the tubular shaft 86 and the spinner 74.

Disposed within the spinner is a distributor or means 112 for distributing the glass o fthe stream from a feeder 14 onto the inner peripheral surface 110 of the peripheral wall 78.

In the embodiment illustrated, the distributor 112 is a cup-shaped member having a floor or bottom wall 114 and a peripheral wall 116, the latter having a plurality of openings 118 through which glass is projected by centrifugal forces of rotation to the surface 110 of the rotor. The distributor 112 is equipped with a member 120 removably secured by bolts 122 to a circular collar 124 mounted on the lower region of the tubular shaft 86.

Supported on the frame 50 is an annularly-shaped plate 128 upon which is mounted a member 130. The member 130 supports three concentric sleeves 132, 134 and 136 forming components of a burner construction 138 disposed within the hollow shaft 86. Arranged at the lower end of the sleeve 134 and engaging the innermost sleeve 132 is a closure 140. The chamber 142 defined by the sleeves 132 tnd 134 provides a cooling jacket through which water or other cooling fluid may be circulated in a conventional manner.

Secured to the lower ends of the innermost sleeve 132 and the outer sleeve 136 is an orifice plate 144 having a plurality of comparatively small passages or orifices 146.

The member 130 is fashioned with a circular manifold chamber 148, member 130 having an opening accommodating a pipe 150 connected with a supply of combustible fuel and air mixture. A valve means (not shown) is connected with the pipe 150 to control delivery of combustible mixture into the annular chamber 152 defined by the sleeves 134 and 136.

The orifice plate 144 is disposed above the distributor 114 and the combustible mixture is delivered under low pressure through the orifices 146, the mixture being burned exteriorly of the orifice plate 144 for heating the spinner and distributor during start up and, if desired, may be used during normal operation for controlling the temperature in the region of the distributor. Molten glass from a feeder 14 flows by gravity through the passage 154 provided by the sleeve 132 into the distributor.

The peripheral wall 78 of the spinner is preferably of a diameter of twelve inches or more and the peripheral wall area provided with a comparatively large number of small orifices or passages 79, there being at least ten thousand orifices or outlets 79 and preferably approximately twelve thousand or more outlets or orifices through which streams of glass are projected by centrifugal forces to form primary filaments. A spinner having an exterior diameter of approximately twelve inches provided with about twelve thousand orifices for glass streams has been found to be satisfactory without encountering appreciable fiber interference during attenuation. Means is provided for delivering an annular gaseous attenuating blast into engagement with the outwardly moving primary filament for attenuating the filaments to fine discrete fibers 20.

Surrounding the spinner 74 is a blower construction 156 which is inclusive of an annularly-shaped member 158 shaped to provide an annular manifold 160, a top plate or cover plate 162 being secured to member 158 by screws 164.

Figure 3:
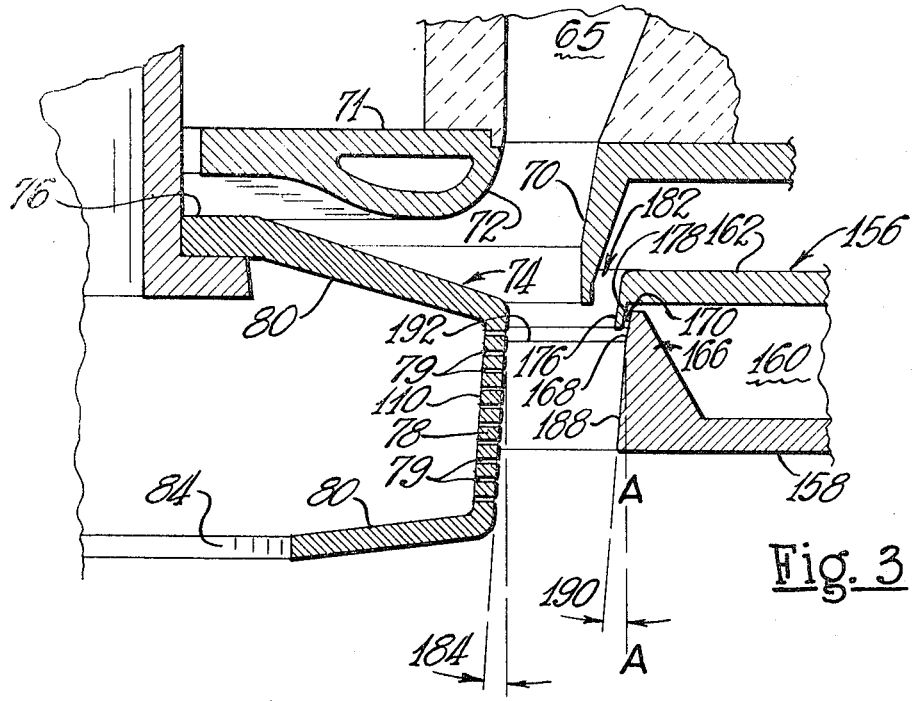
FIG. 3 is a fragmentary sectional view illustrating the large diameter spinner and blast producing blower.

The manifold member 158, shown in FIGS. 2 and 3, is fashioned with an upwardly extending circular wall 166 having an upwardly and outwardly flaring or frusto-conically shaped surface 168 and an inwardly extending portion provided with a plurality of circumferentially spaced slots or orifices 170 through which steam or other fluid under pressure in the manifold 160 is delivered to provide the high velocity gas attenuating blast.

The cover member 162 has a depending portion or skirt 176 which engages a surface of member 166 at the region of the slots 170. A frusto-conically shaped surface 178 of the skirt portion 176 cooperates with the surface 168 to direct the gases of the blast moving through the slots 170 into engagement with the primary filaments of glass to attenuate the filaments to fibers. The skirt portion 70 of the plate 62 is spaced from the plate 162 providing an annular passage 182 to admit air to the blast. The taper or angularity of the surface 168 of the blower member 166 with respect to the axis of rotation of the rotor is about twelve degrees but this angle may be varied from ten to fifteen degrees.

In the form shown in FIGS. 2 and 3, the peripheral wall 78 of the rotor or spinner 74 is slanted upwardly and outwardly with respect to the axis of the spinner and the lower flange 82. The angularity indicated at 184 of the outer surface of the peripheral wall 78 is preferably between two and five degrees with respect to the axis of rotation of the rotor. The diameter of the spinner at its maximum dimension is about twelve inches but the rotor may be of greater diameter if desired. The spinner is rotated to provide a peripheral linear speed preferably exceeding six thousand feet per minute. Where a spinner of larger diameter is employed, the speed of rotation is proportionately reduced.

Another factor in attaining improved attenuation of the primary filaments to fibers resides in the angularity of the interior circular surface 188 of member 166. Heretofore it has been a practice to provide a surface corresponding to the surface 188 but flared in a downward direction in diverging relation with the axis of rotation of the spinner. It has been found that by providing a reverse angle for the surface 188 wherein the surface is in converging relation downwardly with respect to the axis of rotation of the spinner, several advantageous results are attained.

The taper or angularity, indicated at 190 with respect to the line A—A which is parallel with the axis of rotation of the spinner, is within a range of two degrees to ten degrees and is preferably of about a five degree angle. The horizontal line 192, indicating the apex of convergence of the surfaces 168 and 188, is preferably slightly below the plane of the upper row of orifices or passages 79 in the peripheral spinner wall to attain satisfactory attenuation.

As shown in FIG. 3, the angularity of the exterior surface of the rotor wall 78 and the angularity of the surface 188 of the blower face are in converging relation in a downward direction from the plane of the line 192. Through this arrangement the high velocity gases of the blast are directed toward the spinner wall 78.

The hot gases of combustion from the burner chamber 65 flow downwardly along the peripheral wall 78 of the spinner and are maintained in contact with the wall throughout its length by the gases of the blast from the blower 156 and the blast-induced air flowing through the passage 182.

By maintaining the hot gases of combustion adjacent and in contact with the spinner wall 78, a substantially uniform heat pattern is established and maintained for the primary filaments so that all of the filaments are of substantially the same viscosity. By confining and thereby restricting the expansion of the gases, induced air and gases of the blast in the converging walled zone provided by the spinner wall 78 and the blower surface 188, a high blast velocity is maintained for an increased distance below the blast gas delivery slots 170 and turbulence at the attenuating region is substantially reduced.

This arrangement greatly improves attenuation of the primary filaments, resulting in longer fibers of better quality. It is found that through this method of attenuation that the steam pressure producing the blast may be reduced by twenty percent or more and provide efficient attenuation thereby effecting substantial reduction in heat energy with increased fiber yield.

While the reasons for improved attenuation may not be fully understood, it is found that attenuated fibers produced through the use of the method and apparatus disclosed, when processed into a mat, provide a mat of substantially less density without any reduction in the heat insulating characteristics or K factor.

The heat of combustion of the gases from the burner chamber 65 provides a heated environment of a temperature well above the softening temperature of the glass along the peripheral wall or orificed region of the spinner to maintain all of the primary filaments in a softened condition and of substantially the same viscosity during their traverse from the periphery of the spinner into the attenuating blast. By confining or restricting the admission of induced air to the blast through the annular throat or passage 182, the gases of the blast and the induced air confine the heat from the chamber 65 throughout the depth or length of the spinner wall 78.

Figure 4:
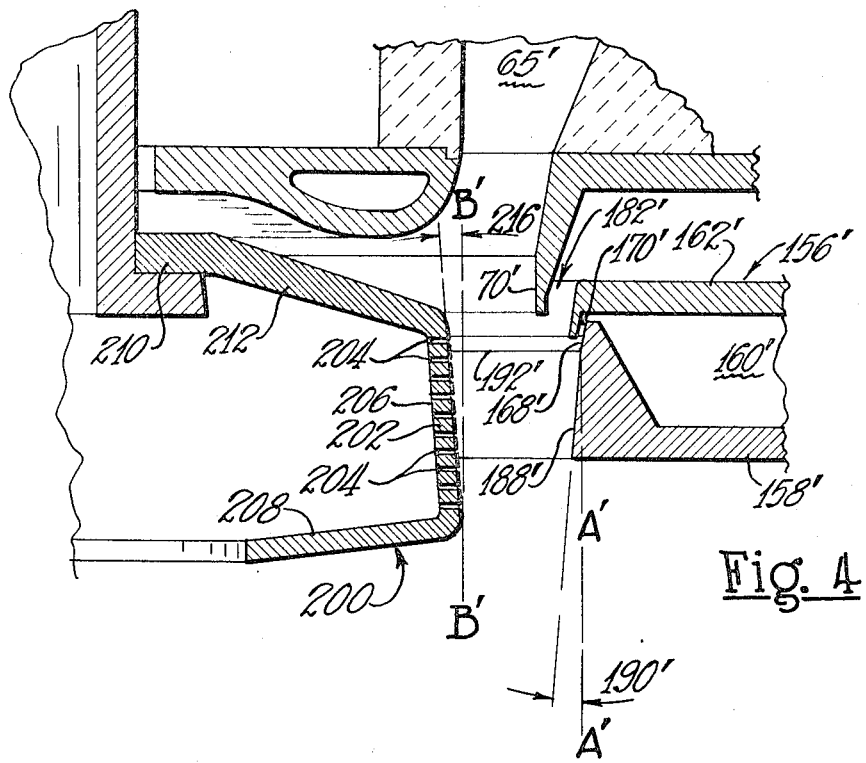
FIG. 4 is a view similar to FIG. 3 illustrating a modified form of rotor construction.

FIG. 4 illustrates the apparatus of the invention involving a modification of the peripheral wall or orificed region of the spinner with respect to the axis of rotation of the spinner. In this form the combustion chamber 65′, the depending skirt 70′, and the members 158′, 162′ providing the blower manifold 160′ are of the same construction as shown in FIG. 3.

Induced air is admitted to the blast through the passage or restricted throat 182′ and the gases providing the blast from the manifold chamber are delivered through the circumferentially-spaced slots 170′. The angularity of the surfaces 168′ and 188′ of the blower construction 156′ are substantially the same as the angularities of the corresponding surfaces shown in FIG. 3.

In this form the spinner or rotor construction 200 is fashioned with a peripheral wall 202, the peripheral wall having a large number of comparatively small orifices or passages 204 through which glass on the interior surface 206 of the rotor wall is delivered by centrifugal forces of rotation as primaries or primary filaments of glass delivered into an annularly-shaped blast of high velocity provided by the gases flowing through the slots 170' of the blower construction 156'. In this form the maximum diameter of the rotor, which is about twelve inches or more, is at the lower end of the rotor wall at its juncture with the flange 208.

A hub portion 210 is joined with the upper end of the peripheral wall 202 by a web or flange portion 212. The angularity or taper, indicated at 190', of the inner surface or profile 188' of the blower construction with respect to the axis of rotation of the spinner or the line A'A' parallel to the spinner axis may be the same as the angularity 190 indicated in FIG. 3, that is, an angularity of between two degrees to ten degrees converging downwardly toward the axis.

The spinner 200 is fashioned with the exterior surface of peripheral wall 202 converging upwardly and inwardly toward the spinner axis at an angle indicated at 216. This angularity 216 with respect to a vertical line B'B' parallel to the spinner axis may be in a range from the vertical line B'B' to five degrees and preferably of an angularity of about two degrees.

The arrangement illustrated in FIG. 4 is found to provide efficient attenuation of the primaries to fine fibers without appreciable turbulence of the gases. It is preferable that the angularity of the surface of the peripheral wall 206 and the angularity of the surface 188' be correlated so that there is a slight convergence of the spinner wall surface and the blower surface 188' at the region below the apex line 192'. Through such construction the high velocity of the attenuating blast is maintained throughout the length of the spinner wall.

Through the use of the method and apparatus of the invention, the gases of the blast are biased by the surface 188 or the surface 188' toward the spinner and confine the hot gases of combustion from the burner 65 adjacent the entire exterior surface of the peripheral wall 78 to promote the maintenance of a uniform heat pattern for the primary filaments. By confining the gases and restricting expansion thereof the induced air and the hot gases of combustion within the downwardly convergent confining region between the spinner wall and the blower face, the gases of the blast are sustained at a high velocity for a greater distance from the delivery slots and turbulence reduced at the attenuating region.

These factors promote improved attenuation of the primary filaments to long fine fibers of improved quality. The method and arrangement facilitates the use of lower pressures for the gases of the blast rendering the high fiber yield more economical because of the substantial savings in energy. Compressed air may be used to provide the high velocity gaseous blast but the use of steam is preferred.

It is apparent that, within the scope of the invention, modifications and different arrangements may be made other than as herein disclosed, and the present disclosure is illustrative merely, the invention comprehending all variations thereof.

I claim:
1. Apparatus for forming blast-attenuated glass fibers, in combination, a hollow spinner having a peripheral wall area provided with not less than ten thousand orifices, means supplying heat-softened glass to the spinner, means rotating the spinner to project streams of glass through the orifices by centrifugal force, an annular blower manifold surrounding and spaced from the spinner having circumferentially arranged orifice means through which gas at a temperature less than the temperature of the glass is delivered as a high velocity blast into engagement with the streams of glass to attenuate the glass of the streams to fibers, an annular burner chamber in which combustible mixture is burned, an annular passage in communication with said chamber through which intensely hot gases of combustion are delivered from the burner, skirt means defining a wall of said passage for directing the hot gases of combustion downwardly along the orificed peripheral wall area of the spinner and in contact with the streams of glass projected from the spinner, said blower manifold having an annularly shaped member with an inner surface converging downwardly and inwardly toward the outer edge of the spinner and surrounding the spinner defining in conjunction with the peripheral wall of the spinner an annular passage of progressively reduced cross section in a downward direction to direct the gases of the blast downwardly and inwardly toward the spinner wall area to confine the hot gases in contact with the peripheral wall area and in contact with all of the projected streams of glass to maintain the glass of the streams at an attenuating temperature.

2. The combination according to claim 1 wherein the skirt means defines with said blower manifold an annular passage through which air induced by the velocity of the blast is admitted to the region between the downwardly moving intensely hot gases of combustion and the downwardly moving gases of the attenuating blast.

3. The combination according to claim 1 wherein the peripheral wall area of the spinner is provided with about twelve thousand orifices.

4. The combination according to claim 1 wherein the peripheral wall area of the spinner is of frusto-conical shape with the upper region of the peripheral wall being of greatest diameter.

5. The combination according to claim 4 wherein the exterior surface of the peripheral wall of the spinner is approximately twelve inches in diameter.

References Cited

UNITED STATES PATENTS

| 3,044,110 | 7/1962 | Hess | 65—14 |
| 3,084,380 | 4/1963 | Levecque et al. | 65—6 X |
| 3,337,316 | 8/1967 | Fletcher et al. | 65—6 X |

S. LEON BASHORE, Primary Examiner

R. L. LINDSAY, Jr., Assistant Examiner

U.S. Cl. X.R.

18—2.5, 2.6; 65—6